Oct. 22, 1968  J. L. SZAJNA  3,406,874

STACKING CONTAINER

Filed May 4, 1965

INVENTOR
JOHN L. SZAJNA

BY Mason, Porter, Diller & Brown
ATTORNEYS

United States Patent Office 3,406,874
Patented Oct. 22, 1968

3,406,874
STACKING CONTAINER
John L. Szajna, Norridge, Ill., assignor to Continental Can Company, Inc., New York, N.Y., a corporation of New York
Filed May 4, 1965, Ser. No. 453,064
13 Claims. (Cl. 222—143)

This invention relates to a novel container, and in particular, to a novel container provided with means for facilitating the interlocking stacking of the container upon a similar container in a manner heretofore unprovided in conventional stacking-type containers.

An object of this invention is to provide a novel container having upper and lower body portions, the lower body portion terminating in a bottom wall, a handle and a pour spout at diametrically opposite sides of the upper body portion, and both the handle and the pour spout having means for interlocking the bottom wall of a similar container upon the stacking of the latter container with the bottom wall thereof resting upon the handle and pour spout.

A further object of this invention is to provide a novel container having upper and lower body portions, the lower body portion terminating in a bottom wall, the upper body portion having a terminal top wall, the terminal top wall integrally merging with a circumferential upstanding wall portion, the body further including a handle and a pour spout, the handle and pour spout each having a horizontal wall, the horizontal walls integrally merging with an associated one of the circumferential upstanding wall portions in axially spaced relationship to the terminal top wall with the horizontal walls being coplanar, and the bottom wall having means for telescopically surrounding the circumferential upstanding wall portions of another similar container with the circumferential upstanding wall portions limiting radial movement of the stacked containers and the horizontal top walls of the handle and pour spout at least partially supporting such another container thereby effecting the interlocked stacking thereof.

A further object of this invention is to provide a container of the type just described in which the pour spout and handle are confined within an imaginary axial projected volume of the container body whereby the container can be stored in an area of minimum volume.

A further object of this invention is to provide a novel container including each of the features heretofore mentioned, and in addition, to form the container of a pilfer-proof construction with the spout thereof completely closed and providing means for facilitating the opening of the spout prior to the dispensing of a product packaged in the container body.

With the above, and other objects in view that will hereinafter appear, the nature of the invention will be more clearly understood by reference to the following detailed description, the appended claims and the several views illustrated in the accompanying drawing:

Figure 1:
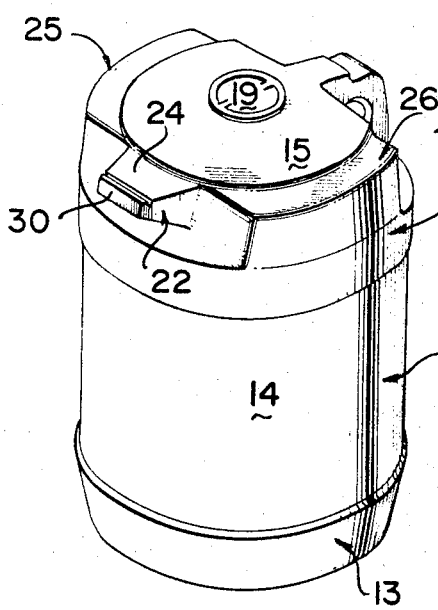
FIGURE 1 is a top perspective view of a novel container constructed in accordance with this invention, and illustrates a pour spout and handle of the container provided with means for interlocking a bottom of a similar container when stacked thereupon.

A novel container constructed in accordance with this invention is generally referred to by the reference numeral 10 and comprises a container body 11 having an upper body portion 12 and a lower body portion 13. A central body portion 14 of the container body 11 is recessed to provide an area for receiving a label (not shown) or other indicia. The container 10 is preferably constructed from plastic material, such as polyethylene, by a conventional molding operation as, for example, by blow-molding.

Figure 2:
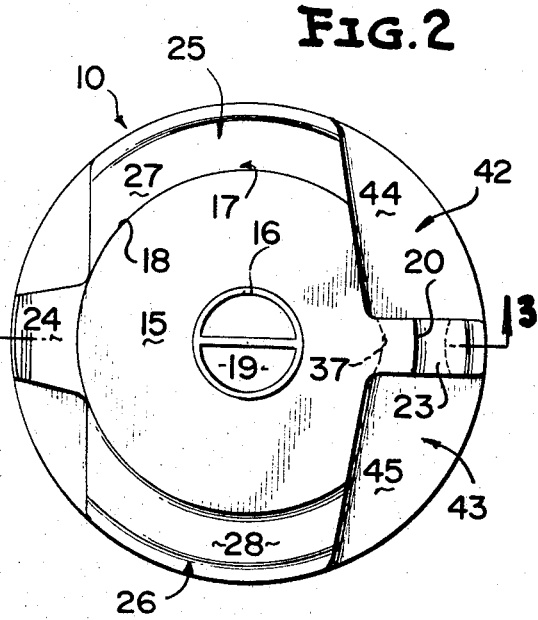
FIGURE 2 is a generally enlarged top plan view of the container of FIGURE 1, and illustrates a pair of supporting shoulders which also include interlocking means, the shoulders being cooperable with the spout and handle to both support and interlock a similar container stacked thereon.

The container body 11 has a terminal top wall 15 which is provided with a fill-opening 16 closed by a plug or fill cap 19 after a desired product (not shown) has been packaged in the container body 11 through the fill opening 16. The terminal top wall 15 is generally slightly convex in shape and terminates peripherally at a circumferential upstanding wall portion 17. As is best illustrated in FIGURE 2 of the drawings, the circumferential upstanding wall portion 17 is discontinuous in nature and includes a major wall portion 18 of approximately 250° in arcuate extent and a minor wall portion 20 formed as an integral part of a hollow handle 21 at the upper body portion 12 of the container body 11.

The handle 21 is diametrically opposite a pour spout 22, and the handle and pour spout include respective horizontal coplanar walls 23, 24 which merge with the respective minor circumferential wall portion 20 and a portion of the major circumferential wall portion 18.

An identical shoulder 25, 26 is positioned between the handle 21 and the pour spout 22 to each side of a vertical plane passing through the handle and pour spout and the axis of the container 10. The shoulders 25 and 26 include respective horizontal walls 27, 28 which integrally merge with generally diametrically opposed portions of the major circumferential upstanding wall portion 18. The horizontal walls 27 and 28 are in coplanar relationship with the horizontal walls 23 and 24 of the respective handle and pour spout 21, 22. The walls 23, 24, 27 and 28 support an uppermost container stacked upon the container 10 as will appear more fully hereafter in the consideration of FIGURE 4 of the drawing.

Figure 3:
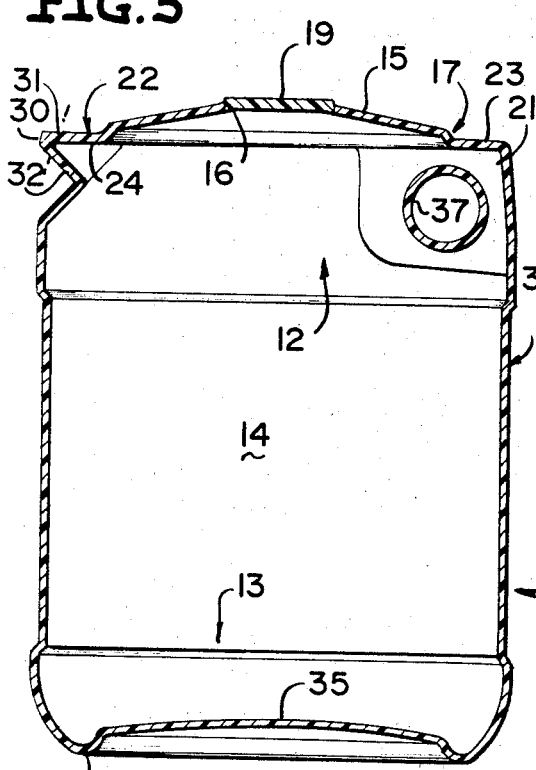
FIGURE 3 is an axial sectional view taken generally along line 3—3 of FIGURE 2, and more clearly illustrates the construction of the spout and handle.

The pour spout 22 is closed by an end wall 30, as is best illustrated in FIGURE 3 of the drawing. Means in the form of a groove 31 in the horizontal wall 24 of the pour spout 22 are provided for removing the end wall 30 to form an opening (not shown) in the pour spout 22. An additional groove (not shown) may be provided in the lower wall 32 (FIGURE 3) of the pour spout 22 to facilitate the removal of the end wall 30. In lieu of the groove 31, a line of perforations or other forms of weakening means could be provided in accordance with this invention to facilitate the removal of the end wall 30 prior to the dispensing of a product packaged in the container through the pour spout 22.

Figure 4:
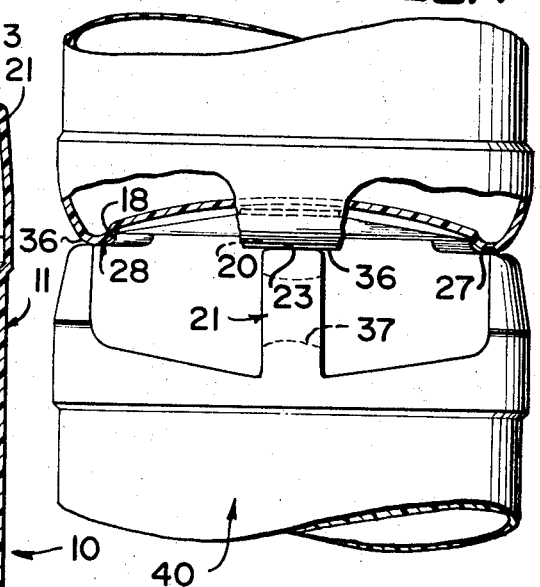
FIGURE 4 is a fragmentary elevational view of a pair of identical containers in stacked relationship with a bottom portion of the uppermost container broken away for clarity, and illustrates the interlocking of the bottom portion of the upper container with an upper portion of the lower container.

The lower portion 13 of the container 10 is constructed to seat upon the horizontal walls 23, 24, 27 and 28 and interlocked at the circumferential wall 17, including the minor circumferential wall portion 20 of the handle 21 and the major circumferential wall portion 18 of the pour spout 24 and the shoulders 27, 28, as is best illustrated in FIGURES 3 and 4 of the drawing. The lower body portion 13 includes a recessed bottom wall 35 integrally merging at its periphery with a downwardly directed annular bead 36. The inner diameter of the annular bead 36 is substantially equal to the distance from the axis of the container body to the circumferential wall portions 18 and 20. This dimensioning permits the stacking of identical containers upon one another in the manner shown in FIGURE 4 with the bead 36 of the container 10 supported by the horizontal walls 23, 24, 27 and 28 of an identical container 40 (FIGURE 4). The containers 10 and 40 are interlocked in the stacked relationship illustrated in FIGURE 4 by the engagement of the circumferential wall portions 18 and 20 with the radially innermost wall (unnumbered) of the bead 36, as is clearly illustrated in FIGURE 4 of the drawing. In this manner, the container 10 of FIGURE 4 is both partially supported and interlocked with the handle 21 and the pour spout 22.

The handle 21 is preferably provided with a finger-receiving opening 37. To facilitate gripping the handle 21 a portion of the upper body portion 12 to either side of the handle 21 is relieved as at 42, 43 by respective walls 44, 45 which taper downwardly and radially outwardly from the terminal top wall 15 to the periphery of the upper body portion 12. The relieved portions 42, 43 permit the handle 21 to be grasped from either the right or the left as viewed in FIGURE 4 of the drawings.

Storage of a plurality of the containers 10 is additionally facilitated by the novel construction of the upper body portion 12, and in particular, in the construction of the pour spout 22 and the handle 21. As is best illustrated in FIGURES 2 and 3 of the drawing, both the pour spout 22 and the handle 21 are confined in a volume defined by the imaginary axial upward projection of the body 1 as viewed in FIGURES 1 and 3 of the drawing. That is, a radial outermost portion of the handle 21 as well as a radial outermost portion of the pour spout 22 does not project beyond the maximum diameter of the container body 11, as is best illustrated in FIGURE 2 of the drawing. This construction of the container 10 permits the same and additional identical containers to be stored in side-by-side relationship, whether stacked or not, without interference between the pour spouts and/or handles of adjacent containers as in conventional structures. That is, with conventional container constructions, either a pour spout or handle or both a pour spout and handle projects beyond the container body which necessitates the manipulation of such containers to prevent the pour spouts and handles from interferring with one another during the side-by-side storage thereof. Even when such conventional containers are manipulated to achieve maximum efficiency with respect to the volume of storage area available, the containers generally occupy a greater volume than the volume of the container bodies. This inefficient use of storage space is, of course, eliminated by the novel construction of the container 10 of this invention.

From the foregoing, it will be seen that novel and advantageous provisions have been made for carrying out the desired end. However, attention is again directed to the fact that additional variations may be made in this invention without departing from the spirit and scope thereof as defined in the appended claims.

I claim:

1. A container comprising a container body, said body having upper and lower body portions, said lower body portion terminating in a bottom wall, a handle and a pour spout at opposite sides of said body, a body wall portion between said handle and pour spout at each side of a vertical plane through said handle and pour spout, and said handle, pour spout and body wall portions having coplanar means for facilitating the stacking of the bottom wall of a substantially similar container upon said handle, pour spout and body wall portions.

2. The container as defined in claim 1 wherein said means are defined by a horizontal top wall of each of said handle, pour spout and body wall portions which merges with an outwardly facing upstanding circumferential wall.

3. The container as defined in claim 2 wherein said bottom wall defines a recess opening axially away from said upper body portion and said bottom recess has an outermost axially inwardly facing circumferential wall which complements the upstanding circumferential walls of said handle, pour spout and body wall portions.

4. A container comprising a container body, said body having upper and lower body portions, said lower body portion terminating in a bottom wall, said upper body portion having a terminal top wall, said terminal top wall integrally merging downwardly with a circumferential upstanding wall portion, said body further including a pour spout, a horizontal wall of said pour spout integrally merging upwardly with said circumferential upstanding wall portion in axial spaced relationship to said terminal top wall, and said bottom wall having means for telescopically surrounding the circumferential upstanding wall portion of another container with said circumferential upstanding wall portion limiting radial movement of the containers and the horizontal wall of the pour spout at least partially supporting such another container thereby effecting the stacking thereof.

5. A container comprising a container body, said body having upper and lower body portions, said lower body portion terminating in a bottom wall, said upper body portion having a terminal top wall, said terminal top wall integrally merging with a circumferential upstanding wall portion, said body further including a handle, a horizontal wall of said handle integrally merging with said circumferential upstanding wall portion in axial spaced relationship to said terminal top wall, and said bottom wall having means for telescopically surrounding the circumferential upstanding wall portion of another container with said circumferential upstanding wall portion limiting radial movement of the containers and the horizontal top wall of the handle at least partially supporting such another container thereby effecting the stacking thereof.

6. A container comprising a container body, said body having upper and lower body portions, said lower body portion terminating in a bottom wall, said upper body portion having a terminal top wall, said terminal top wall integrally merging with circumferential upstanding wall portions, said body further including a handle and a pour spout, said handle and pour spout each having a horizontal wall, said horizontal walls integrally merging with an associated one of said circumferential upstanding wall portions in axial spaced relationship to said terminal top wall, said horizontal walls being coplanar, and said bottom wall having means for telescopically surrounding the circumferential upstanding wall portions of another container with said circumferential upstanding wall portions limiting radial movement of the containers and the horizontal top walls of the handle and pour spout at least partially supporting such another container thereby effecting the stacking thereof.

7. The container as defined in claim 6 including a horizontal wall between the handle and pour spout at each side of a vertical plane through said handle and pour spout, said last-mentioned horizontal walls being coplanar with the horizontal walls of said handle and pour spout and merging with associated ones of said circumferential upstanding wall portions.

8. The container as defined in claim 6 wherein said terminal top wall includes a fill opening, and a plug closing said fill opening.

9. The container as defined in claim 6 wherein said pour spout terminates in a pour opening, and means closing said pour opening.

10. The container as defined in claim 6 wherein said bottom wall is recessed and defines a cavity opening axially away from said upper body portion.

11. A container comprising a container body, said body having upper and lower body portions, said lower body portion terminating in a bottom wall, said upper body portion having a terminal top wall, said terminal top wall integrally merging with a circumferential upstanding wall portion, said body further including a pour spout, a horizontal wall of said pour spout integrally merging with said circumferential upstanding wall portion in axial spaced relationship to said terminal top wall, said bottom wall having means for telescopically surrounding the circumferential upstanding wall portion of another container with said circumferential upstanding wall portion limiting radial movement of the containers and the horizontal top wall of the pour spout at least partially supporting such another container thereby effecting the stacking thereof, said pour spout being confined within an imaginary axial projected volume of said container body.

12. A container comprising a container body, said body having upper and lower body portions, said lower body portion terminating in a bottom wall, said upper body portion having a terminal top wall, said terminal top wall integrally merging with a circumferential upstanding wall portion, said body further including a handle, a horizontal wall of said handle integrally merging with said circumferential upstanding wall portion in axial spaced relationship to said terminal top wall, said bottom wall having means for telescopically surrounding the circumferential upstanding wall portion of another container with said circumferential upstanding wall portion limiting radial movement of the containers and the horizontal top wall of the handle at least partially supporting such another container thereby effecting the stacking thereof, said handle being confined within an imaginary axial projected volume of said container body.

13. A container comprising a container body, said body having upper and lower body portions, said lower body portion terminating in a bottom wall, said upper body portion having a terminal top wall, said terminal top wall integrally merging with circumferential upstanding wall portions, said body further including a handle and a pour spout, said handle and pour spout each having a horizontal wall, said horizontal walls integrally merging with an associated one of said circumferential upstanding wall portions in axial spaced relationship to said terminal top wall, said horizontal walls being coplanar, and said bottom wall having means for telescopically surrounding the circumferential upstanding wall portions of another container with said circumferential upstanding wall portions limiting radial movement of the containers and the horizontal top walls of the handle and pour spout at least partially supporting such another container thereby effecting the stacking thereof, said handle and pour spout being confined within an imaginary axial projected volume of said container body.

References Cited

UNITED STATES PATENTS

| | | | |
|---|---|---|---|
| 3,173,581 | 3/1965 | Pel | 222—143 |
| 3,214,052 | 10/1965 | Dike | 220—97 X |

FOREIGN PATENTS

| | | |
|---|---|---|
| 481,787 | 3/1938 | Great Britain. |
| 538,737 | 8/1941 | Great Britain. |
| 887,893 | 1/1962 | Great Britain. |

ROBERT B. REEVES, *Primary Examiner.*

F. R. HANDREN, *Assistant Examiner.*